US010946920B2

(12) United States Patent
Kojima et al.

(10) Patent No.: US 10,946,920 B2
(45) Date of Patent: Mar. 16, 2021

(54) FUEL TANK STRUCTURE OF STRADDLE VEHICLE

(71) Applicant: HONDA MOTOR CO., LTD., Tokyo (JP)

(72) Inventors: Takamasa Kojima, Saitama (JP); Ken Kojika, Saitama (JP); Daisuke Kuramochi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 250 days.

(21) Appl. No.: 16/075,385

(22) PCT Filed: Feb. 5, 2016

(86) PCT No.: PCT/JP2016/053587
§ 371 (c)(1),
(2) Date: Aug. 3, 2018

(87) PCT Pub. No.: WO2017/134834
PCT Pub. Date: Aug. 10, 2017

(65) Prior Publication Data
US 2019/0185098 A1 Jun. 20, 2019

(51) Int. Cl.
*B01D 50/00* (2006.01)
*B62J 35/00* (2006.01)
(Continued)

(52) U.S. Cl.
CPC .............. *B62J 35/00* (2013.01); *B62J 37/00* (2013.01); *F02M 25/089* (2013.01);
(Continued)

(58) Field of Classification Search
CPC ....... B62J 35/00; B62J 37/00; F02M 25/0872; F02M 25/089; F02M 37/00; B60K 15/035; B21D 53/86
See application file for complete search history.

(56) References Cited

U.S. PATENT DOCUMENTS 4,807,472 A * 2/1989 Brown ................ B60K 15/061
338/33
5,944,216 A * 8/1999 Inaoka .................. B60K 15/03
220/4.14
(Continued)

FOREIGN PATENT DOCUMENTS

JP H06-008867 A 1/1994
JP H07-309277 A 11/1995
(Continued)

OTHER PUBLICATIONS

Apr. 12, 2016, International Search Report issued for related PCT Application No. PCT/JP2016/053587.
(Continued)

*Primary Examiner* — Dung H Bui
(74) *Attorney, Agent, or Firm* — Paratus Law Group, PLLC

(57) ABSTRACT

A fuel tank structure of a straddle vehicle includes a fuel tank which accumulates fuel supplied from a fuel filler port, a fuel tray which is provided above the fuel tank so as to surround the fuel filler port, and a gas-liquid separator which is connected to the fuel tank and separates the fuel into gas and liquid. The gas-liquid separator is spaced apart from the fuel tank and provided on the fuel tray.

6 Claims, 9 Drawing Sheets

(51) Int. Cl.
*B62J 37/00* (2006.01)
*F02M 25/08* (2006.01)
*B60K 15/035* (2006.01)
*B21D 53/86* (2006.01)
*F02M 37/00* (2006.01)

(52) U.S. Cl.
CPC ......... *F02M 25/0872* (2013.01); *B21D 53/86* (2013.01); *B60K 15/035* (2013.01); *F02M 37/00* (2013.01)

(56) References Cited

U.S. PATENT DOCUMENTS

| | | | | |
|---|---|---|---|---|
| 6,000,426 | A * | 12/1999 | Tuckey | B60K 15/035 123/516 |
| 2012/0204842 | A1 * | 8/2012 | Kiyomiya | F02M 25/089 123/520 |
| 2012/0247434 | A1 * | 10/2012 | Shimura | F02M 25/089 123/520 |
| 2012/0312619 | A1 * | 12/2012 | Inaoka | B62J 31/00 180/219 |
| 2013/0061950 | A1 * | 3/2013 | Inaoka | F02M 25/089 137/351 |
| 2013/0306628 | A1 * | 11/2013 | Aso | B60K 15/035 220/4.14 |
| 2016/0222923 | A1 * | 8/2016 | Vulkan | B60K 15/035 |

FOREIGN PATENT DOCUMENTS

| | | |
|---|---|---|
| JP | 2003-063471 A | 3/2003 |
| JP | 2004-098809 A | 4/2004 |
| JP | 2012-020633 A | 2/2012 |
| JP | 2013-095231 A | 5/2013 |

OTHER PUBLICATIONS

Apr. 12, 2016, International Search Opinion issued for related PCT Application No. PCT/JP2016/053587.

Apr. 8, 2019, European Search Report issued for related EP Application No. 16889319.6.

* cited by examiner

FUEL TANK STRUCTURE OF STRADDLE VEHICLE

CROSS REFERENCE TO PRIOR APPLICATION

This application is a National Stage Patent Application of PCT International Patent Application No. PCT/JP2016/053587 (filed on Feb. 5, 2016) under 35 U.S.C. § 371, which is hereby incorporated by reference in its entirety.

TECHNICAL FIELD

The present invention relates to a fuel tank structure of a straddle vehicle such as a motorcycle.

BACKGROUND ART

In the related art, a fuel tank structure of a straddle vehicle has been known which includes a gas-liquid separator for separating volatile components of fuel and liquid fuel. In Patent Literature 1, a fuel tank is described which has a double wall structure constituted by a tank inner and a tank outer, and a gas-liquid separator is provided in a space formed with the tank inner and the tank outer.

PRIOR ART LITERATURE

Patent Literature

[Patent Literature 1]: JPA 1994-8867

SUMMARY OF THE INVENTION

Problem that the Invention is to Solve

However, as described in Patent Literature 1, when the gas-liquid separator is disposed in the tank, for example, since a structure for supporting the gas-liquid separator is provided in the fuel tank, the internal shape and structure of the tank becomes complicated. In addition, in order to make the gas-liquid separator function, there is restriction on an installation position such that the arrangement of the gas-liquid separator is limited to a place which is in the upper surface of the fuel tank and is horizontal with respect to the ground. Further, when a support portion of the gas-liquid separator is provided in the tank inner, there is a problem in that the processing cost is increased because the tank inner has a thin structure.

The invention provides a fuel tank structure of a straddle vehicle having a high degree of freedom of an arrangement of a gas-liquid separator and a high degree of freedom of a shape of a fuel tank.

Means for Solving the Problem

The invention provides the following aspects.

According to a first aspect, a fuel tank structure of a straddle vehicle includes:
a fuel tank which accumulates fuel supplied from a fuel filler port;
a fuel tray which is provided above the fuel tank so as to surround the fuel filler port; and
a gas-liquid separator which is connected to the fuel tank and separates the fuel into gas and liquid,
wherein the gas-liquid separator is spaced apart from the fuel tank and provided on the fuel tray.

According to a second aspect, in the first aspect,
the gas-liquid separator is a resin member integrally formed with the fuel tray.

According to a third aspect, in the first aspect or the second aspect,
a bottom surface of the gas-liquid separator is inclined at an angle different from that of a tank upper surface of the fuel tank.

According to a fourth aspect, in any one of the first aspect to the third aspect,
the gas-liquid separator includes: a breather pipe connection portion, to which a breather pipe leading to the fuel tank is connected, in a lower portion; and a purge pipe connection portion, to which a purge pipe leading to a canister is connected, in an upper portion.

According to a fifth aspect, in the fourth aspect.
a rising portion inclined toward an upper left side is provided in the bottom surface of the gas-liquid separator.

According to a sixth aspect, in any one of the first aspect to the fifth aspect,
the fuel tank is covered with a cover member including a fuel lid which is openable and closable above the fuel tray, and
the gas-liquid separator is arranged in a space between the fuel tank and the cover member.

According to a seventh aspect, in the sixth aspect.
a breather pipe for connecting the fuel tank and the gas-liquid separator is routed between the fuel tank and the cover member on a side of a tray portion of the fuel tray.

Advantage of the Invention

According to the first aspect, since the gas-liquid separator is provided on the fuel tray, the gas-liquid separator can be arranged without being restricted by the outer surface structure of the fuel tank, as compared with the structure in which the gas-liquid separator is provided on the outer surface of the fuel tank. Therefore, it is possible to improve the degree of freedom of the arrangement of the gas-liquid separator. Also, since the gas-liquid separator is supported by the fuel tray, it is unnecessary to provide a base for supporting the gas-liquid separator in the fuel tank, and thus the degree of freedom of the shape of the fuel tank is improved. As a result, the size of the fuel tank can be increased.

According to the second aspect, in a case of a separator, since the gas-liquid separator is integrally formed with the fuel tray with the same resin, it is possible to reduce the number of parts and assembly processes. As a result, it is possible to place the gas-liquid separator with reduced manufacturing cost. Also, by providing the gas-liquid separator in the fuel tray, the gas-liquid separator can be placed outside the fuel tank, and thus there is no need to provide the gas-liquid separator inside the fuel tank. Therefore, the volume of the fuel tank can be increased.

Furthermore, since the gas-liquid separator is provided on the fuel tray, the gas-liquid separator is arranged above the fuel tank, and thus it is possible to have a structure in which the fuel in the fuel tank hardly flows to the gas-liquid separator. Therefore, the gas-liquid separation function of the gas-liquid separator is improved.

According to the third aspect, since the lower surface of the gas-liquid separator is inclined at an angle different from that of the tank upper surface of the fuel tank, the lower surface of the gas-liquid separator and the upper surface of the fuel tank can be freely designed with priority given to their respective functions without affecting each other. As a result, the degree of freedom of the arrangement of the gas-liquid separator is improved and the degree of freedom of the shape of the fuel tank is improved, and thus the size of the fuel tank can be easily increased.

According to the fourth aspect, since the gas-liquid separator is provided with the breather pipe connection portion to which the breather pipe is connected in the lower portion and the purge pipe connection portion to which the purge pipe leading to the canister is connected in the upper portion, the liquid fuel flows to the lower portion and the volatilized fuel flows to the upper portion, and thus gas-liquid separation is effectively performed. Therefore, the gas-liquid separation function of the gas-liquid separator can be enhanced.

According to the fifth aspect, since the bottom surface of the gas-liquid separator is provided with the rising portion which is inclined toward the upper left side, it is possible to prevent the liquid fuel from flowing into the purge pipe even when the vehicle is parked with the side stand upright, and thus the fuel in gas-liquid separator can flow reliably from the breather pipe connection portion to the fuel tank side. Therefore, the gas-liquid separation function of the gas-liquid separator can be enhanced.

According to the sixth aspect, since the gas-liquid separator is arranged in the space between the fuel tank and the cover member, it is possible to effectively utilize the dead space of the vehicle, and thus it is possible to prevent an increase in the size of the vehicle.

According to the seventh aspect, since the breather pipe is routed between the fuel tank and the cover member on the side of the tray portion of the fuel tray, it is possible to effectively utilize the dead space of the vehicle to arrange the breather pipe with the gas-liquid separator, and thus it is possible to prevent an increase in the size of the vehicle.

MODE FOR CARRYING OUT THE INVENTION

Figure 1:
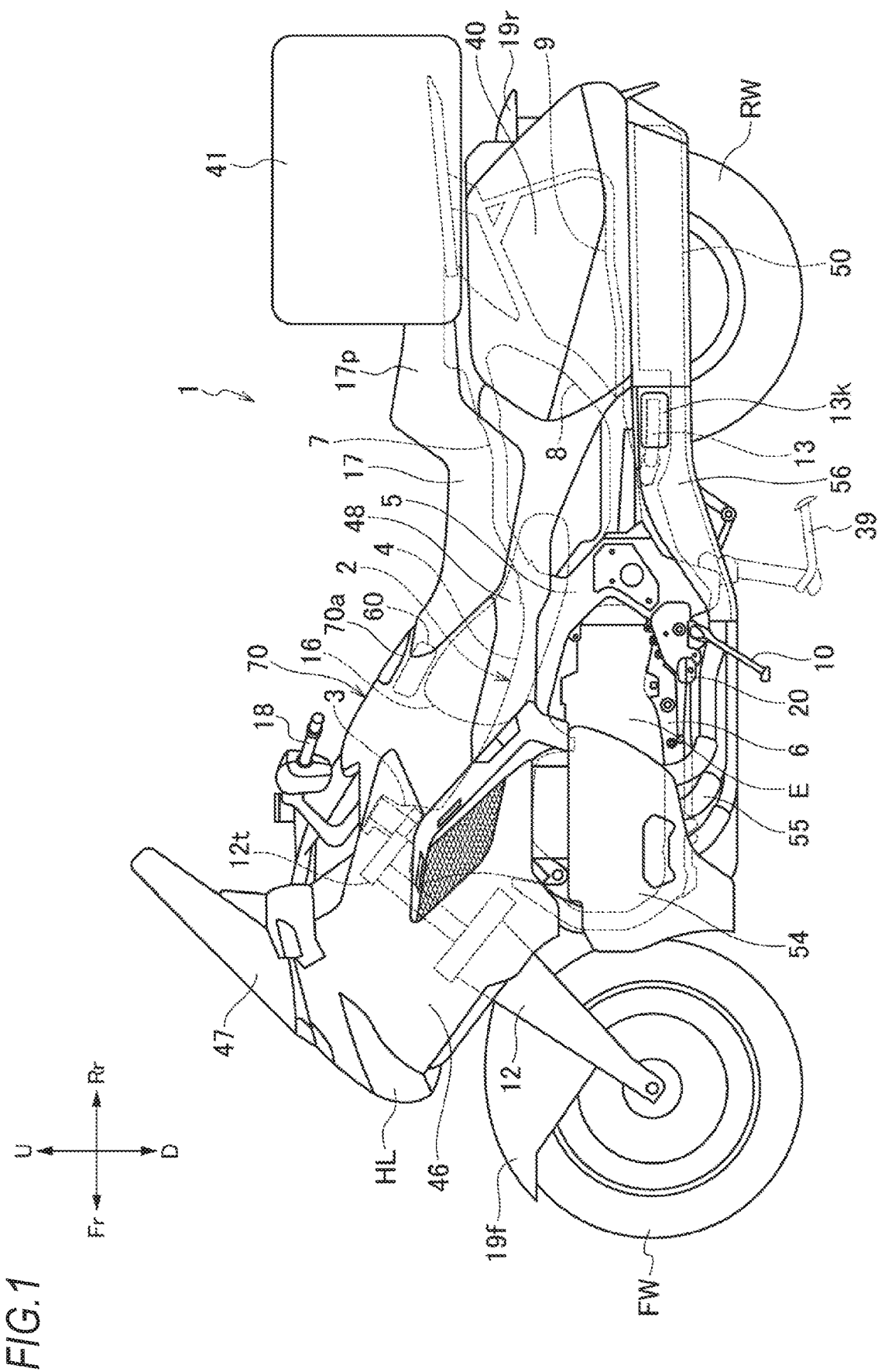
FIG. 1 is a left side view of a motorcycle according to an embodiment of a straddle vehicle according to the invention.
Figure 2:
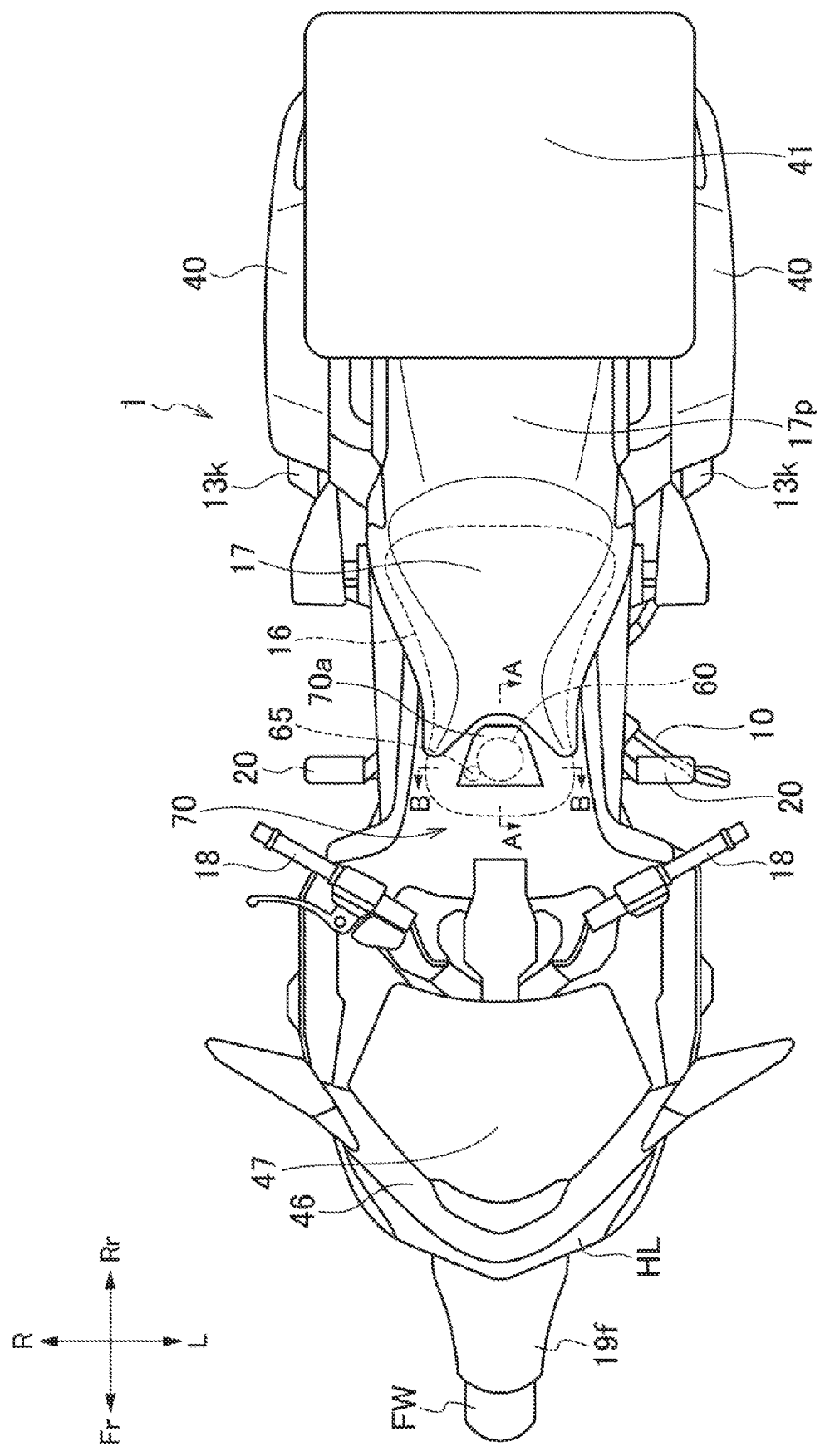
FIG. 2 is a plan view of the motorcycle illustrated in FIG. 1 as viewed from above.

Hereinafter, a motorcycle which is a straddle vehicle adopting a fuel tank structure according to an embodiment of the invention will be described with reference to FIGS. 1 to 9. In the following description, the drawings shall be viewed in a direction of reference signs and front and rear, left and right, and up and down are described in accordance with a direction viewed from a rider. Further, in the drawings, the front of the vehicle is indicated by Fr, the rear is Rr, the left is L, the right is R, the upper is U, and the lower is D.

As illustrated in FIG. 1, a body frame 2 as a skeleton portion in a motorcycle 1 has a pair of right and left main frames 4 extending rearward and downward from a head pipe 3, a pair of pivot frames 5 extending downward from the main frame 4, a pair of lower frames 6 which extends downward from the head pipe 3 and extends rearward, and further, is connected with the lower portion of the pivot frame 5, a pair of seat frames 7 which extends obliquely upper-rearward from the pivot frame 5, a pair of rear lower frames 8 for supporting the seat frame 7 from the lower side, and a bag frame 9 for supporting a saddle bag 40 and the like which will be described below on the rear side of the rear lower frame 8.

The head pipe 3 is attached to a top bridge 12t of a front fork 12 on which a front wheel FW is steerably mounted and a steering handle 18 is mounted on the top bridge 12t. In the body frame 2, a side stand 10 for supporting the vehicle body at the time of parking a vehicle is provided only on the left side of the lower portion at a substantially center portion in a front-rear direction of the vehicle, and a main stand 39 is installed further on the rear side from the side stand 10. Also, just in front of the side stand 10, a main step 20 on which a rider's foot is placed is installed so as to protrude to both the right and left sides (see FIG. 2).

On the seat frame 7, a riding seat 17 on which a driver sits and a passenger seat 17p on which an additional rider sits are arranged so as to have steps in the front-rear direction. Also, a trunk box 41 is provided behind the passenger seat 17p.

An engine E is mounted in a space surrounded by the main frame 4, the pivot frame 5, and the lower frame 6. An exhaust pipe 55 extending obliquely to the rear-lower side from the engine E further extends backward and is connected to a muffler 50. Further, a rear wheel RW is appropriately supported by the body frame 2 via a swing arm, a cushion unit, and the like (not illustrated). Saddle bags 40 are provided on both right and left sides of the rear wheel RW and the mufflers 50 are provided on the lower side of the saddle bag 40 so as to pinch the rear wheel RW.

Figure 3:
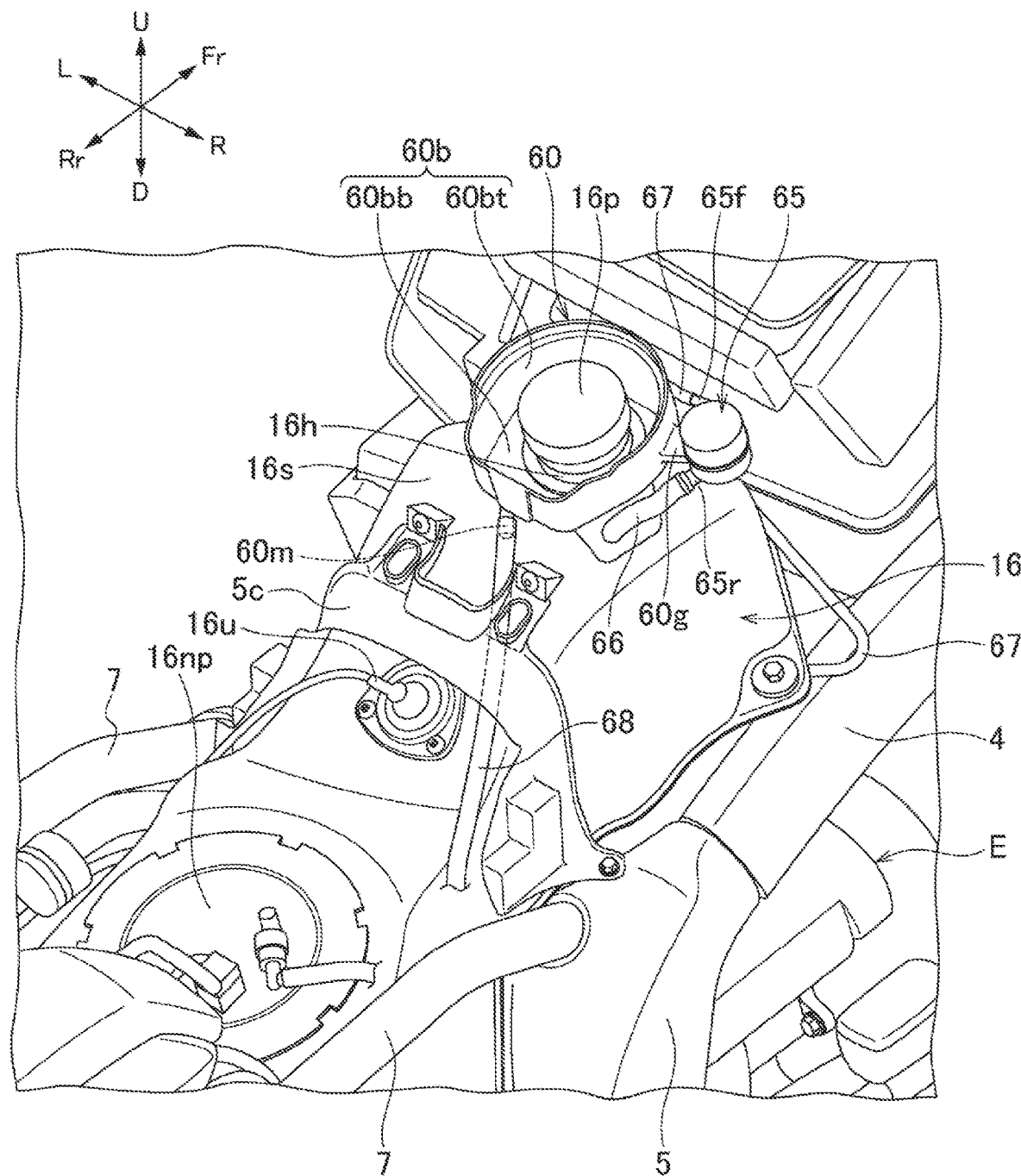
FIG. 3 is a perspective view illustrating a state where a cover member above a fuel tank in the motorcycle illustrated in FIG. 1 is removed.

As illustrated in FIG. 3, a fuel tank 16 which is appropriately fixed to a cross member 5c and the like suspended across the main frame 4 and the pivot frame 5 is disposed above the engine E.

The outer surface of a vehicle is appropriately covered with a cover member. Also referring to FIG. 2, a headlight HL is provided at the center of the front portion of the vehicle and a front cowl 46 is provided so as to cover the upper, lower, left, and right sides of the headlight HL. A front screen 47 is provided above the front cowl 46.

A side cover 48 is provided behind the front cowl 46 so as to cover the sides of the main frame 4 and the fuel tank 16, and a top cover 70 is provided so as to cover the obliquely upper front side of the fuel tank 16. Further, a head cover 54 and the like for covering the side surface of the engine E and the like are provided below the front cowl 46.

A rear portion of the exhaust pipe 55 and the muffler 50 are covered with an exhaust pipe cover 56 and the exhaust pipe cover 56 is provided with a guard body cover 13k covering a guard body 13 protruding from an opening portion. Further, the upper portion of the front wheel FW is covered with a front fender 19f and the upper portion of the rear wheel RW is covered with a rear fender 19r.

As illustrated in FIG. 3, in the fuel tank 16, a fuel filler port 16h through which the fuel is filled is provided in the front portion of a tank upper surface 16s and a fuel tray 60 is provided so as to surround the fuel filler port 16h. Further, in FIG. 3, reference numerals and letters 16p indicate an oil inlet cap for sealing the fuel filler port 16h and reference numerals and letters 16u indicate a remaining fuel sensor. In the fuel tray 60, a gas-liquid separator 65 that is connected to the fuel tank 16 and separates the fuel into gas and liquid is integrally provided. A fuel pump 16np for supplying the fuel in the fuel tank 16 to the engine E is provided in the rear portion of the tank upper surface 16s so as to protrude into the tank.

Figure 4:
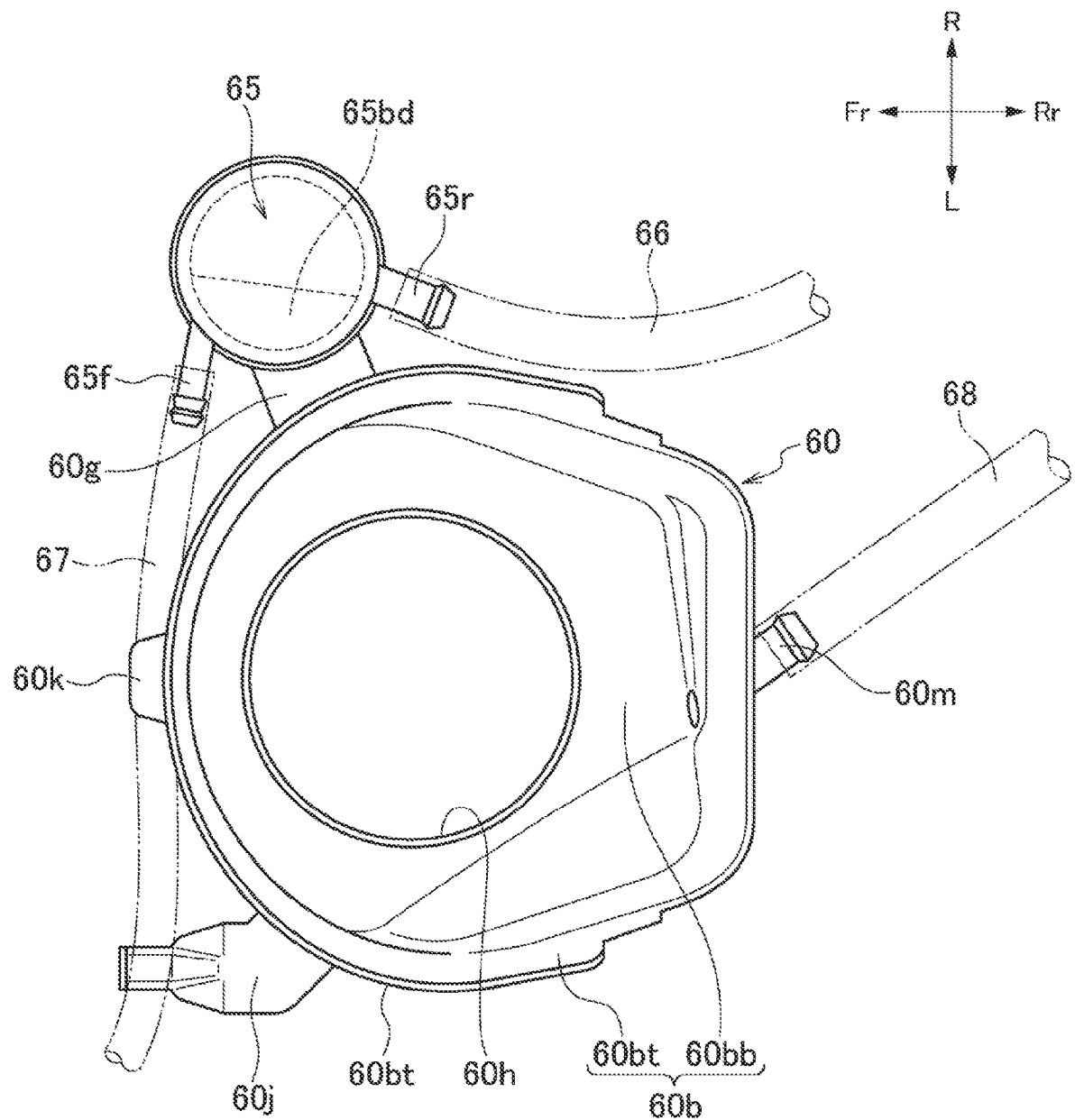
FIG. 4 is a plan view of a fuel tray as viewed from above.

As illustrated in FIG. 4, the fuel tray 60 has a tray portion 60b which has a cup shape and is formed by a tray bottom surface portion 60bb and a side wall portion 60bt rising from the outer edge portion of the tray bottom surface portion 60bb and a tray opening 60h having a circular shape is provided in the tray bottom surface portion 60bb. Further, in the rear portion of the side wall portion 60bt, a drain connection portion 60m protrude right-rearward and downward. In the front portion of the side wall portion 60bt, a central guide portion 60k and a left guide portion 60j for holding a purge pipe 67 described below are respectively provided in the substantially central portion and the left side. Further, the gas-liquid separator 65 having a cylindrical shape is provided in the front portion of the fuel tray 60 on the opposite side (right side) to the left guide portion 60j with the central guide portion 60k interposed therebetween. In the drain connection portion 60m, surplus fuel is discharged to the lower portion of a vehicle body via a drain pipe 68.

Figure 5:
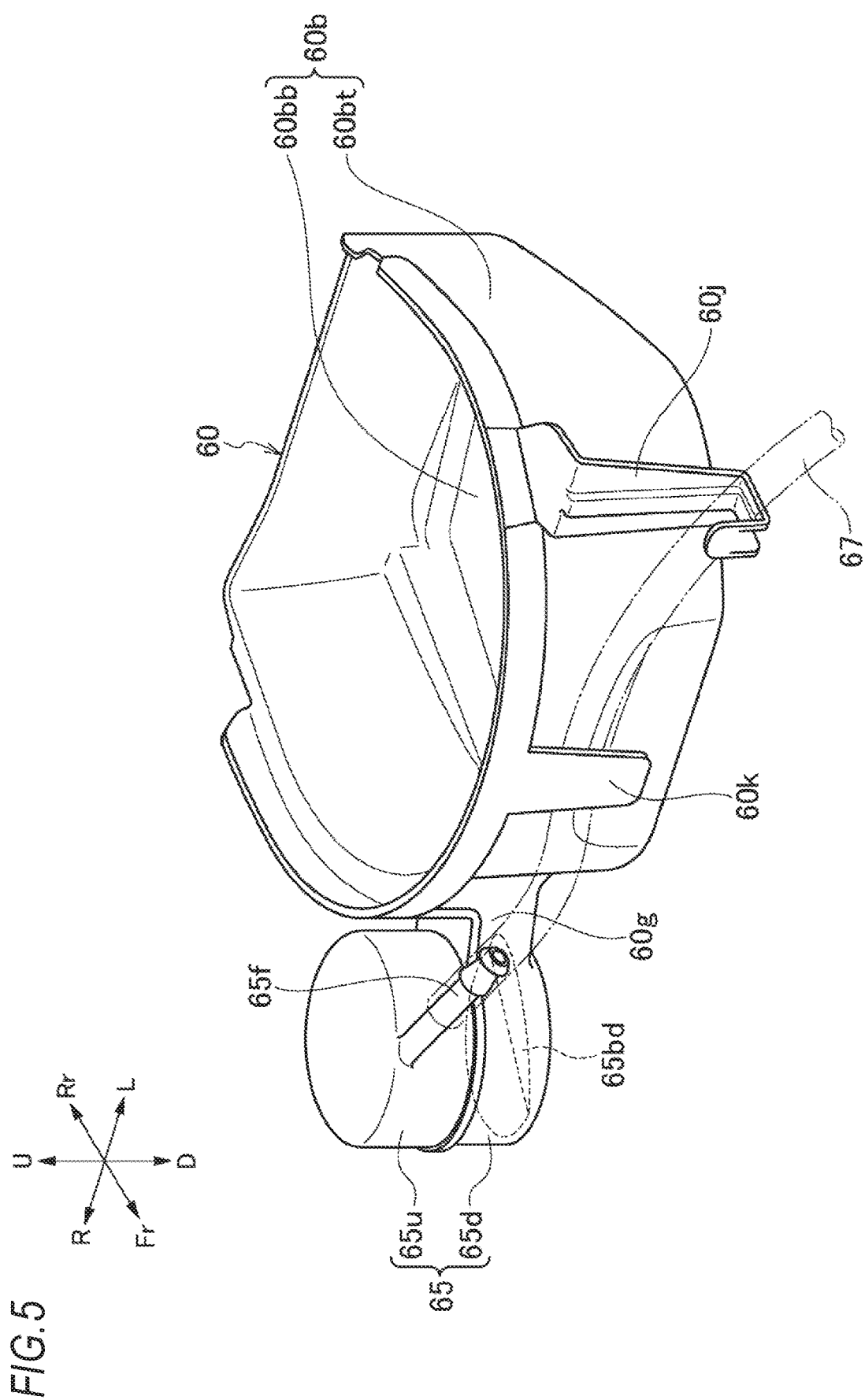
FIG. 5 is a perspective view of the fuel tray as viewed obliquely from a front upper left side.

As illustrated in FIG. 5, the gas-liquid separator 65 is connected to the fuel tray 60 via a separator connection portion 60g. The fuel tray 60, the separator connection portion 60g, and a separator lower half portion 65d of the gas-liquid separator 65 are simultaneously formed by injection molding. In addition, the separator lower half portion 65d is covered with a separator upper half portion 65u and those are fixed by welding or bonding or the like to form an internal space BS having a predetermined volume (see FIGS. 7 and 8).

Figure 6:
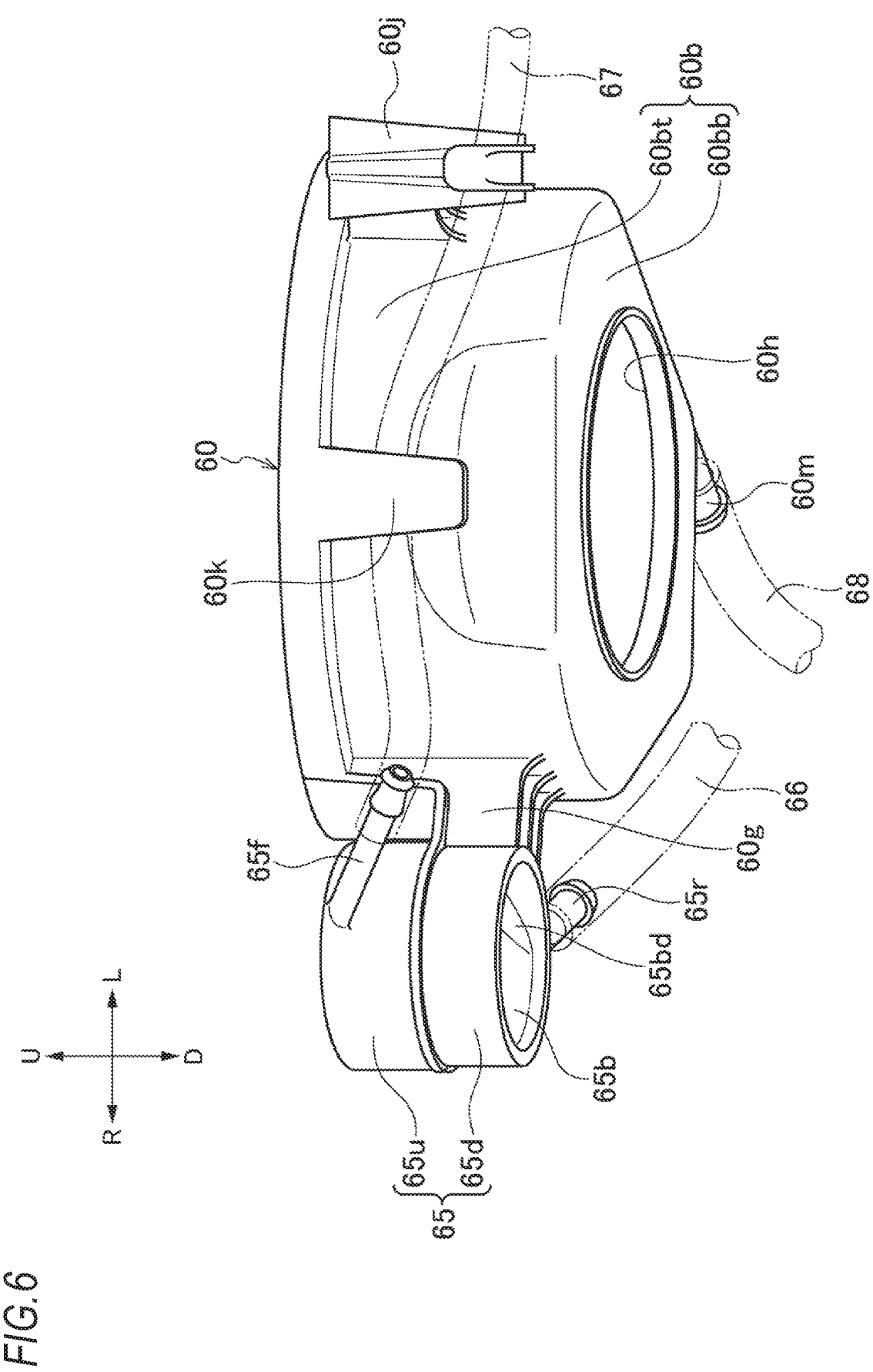
FIG. 6 is a front view of the fuel tray as viewed from the front side.

As illustrated in FIG. 6, in the gas-liquid separator 65, a purge pipe connection portion 65f communicating with the uppermost portion of the internal space BS is provided in the separator upper half portion 65u so as to protrude to the lower left side from the front end portion. The gas-liquid separator 65 is connected to a canister (not illustrated) via a purge pipe 67 connected to the purge pipe connection portion 65f. In the separator lower half portion 65d, a breather pipe connection portion 65r communicating with the lowest portion of the internal space BS protrudes to the rear-lower side from the rear end portion. The gas-liquid separator 65 is connected to the fuel tank 16 via a breather pipe 66 connected to the breather pipe connection portion 65r (see FIG. 7). In this way, the volatile fuel is easily guided to the canister by allowing the purge pipe connection portion 65f to communicate with the uppermost part of the internal space BS, and the liquid fuel is easy to return to the fuel tank 16 by allowing the breather pipe connection portion 65r to communicate with the lowest portion of the internal space BS.

Also, on the bottom surface 65b of the gas-liquid separator 65, a rising portion 65bd is provided so as to be inclined toward the upper left direction from the vicinity of the breather pipe connection portion 65r. The rising portion 65bd is formed by inclining the bottom surface 65b toward the upper left direction. When the bottom surface 65b is viewed from the lower side, it has a shape which is recessed upward as illustrated in FIG. 6.

Figure 7:
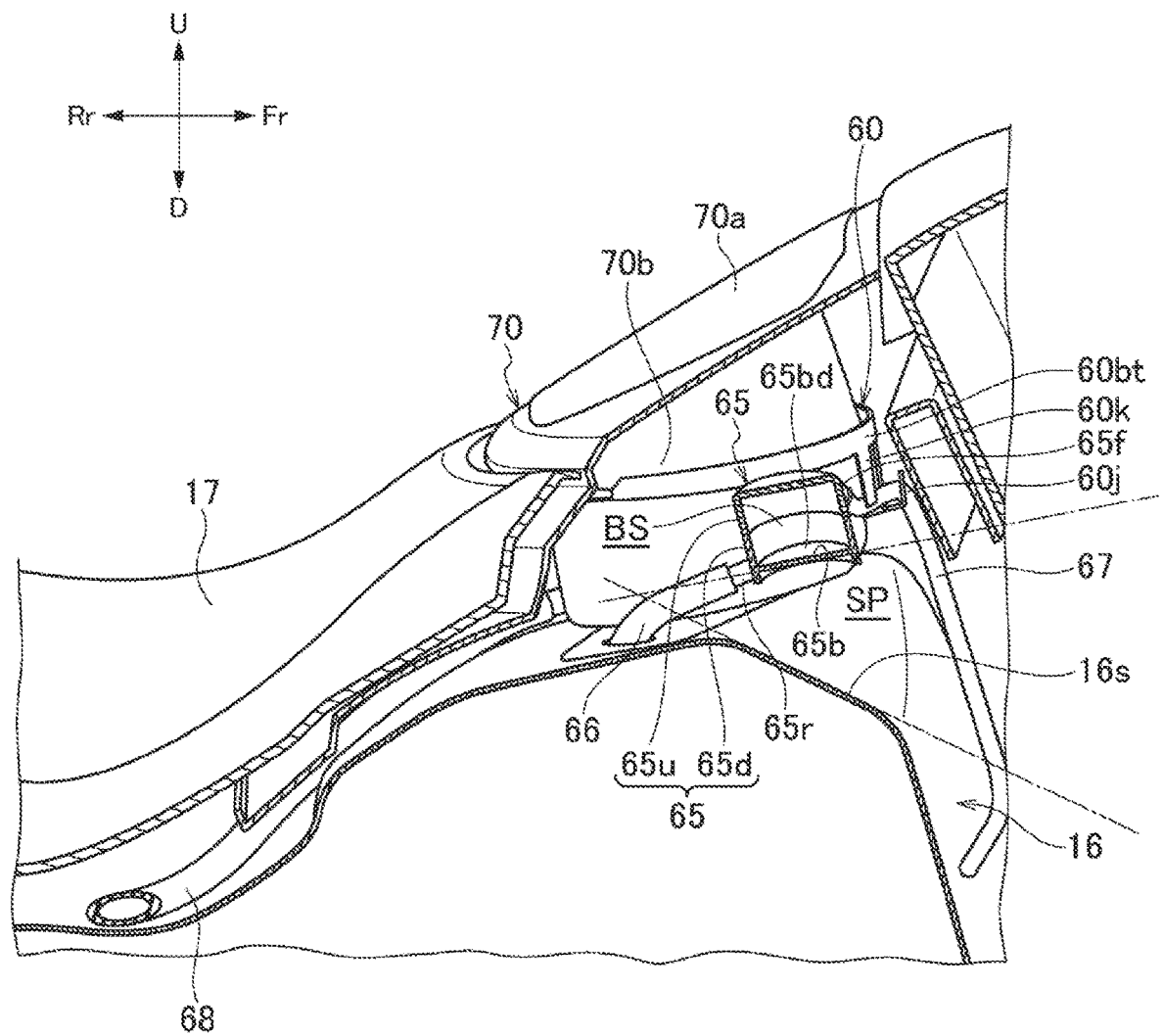
FIG. 7 is a cross-sectional right side view taken along a line A-A of FIG. 2 in a state where the cover member is mounted.
Figure 9:
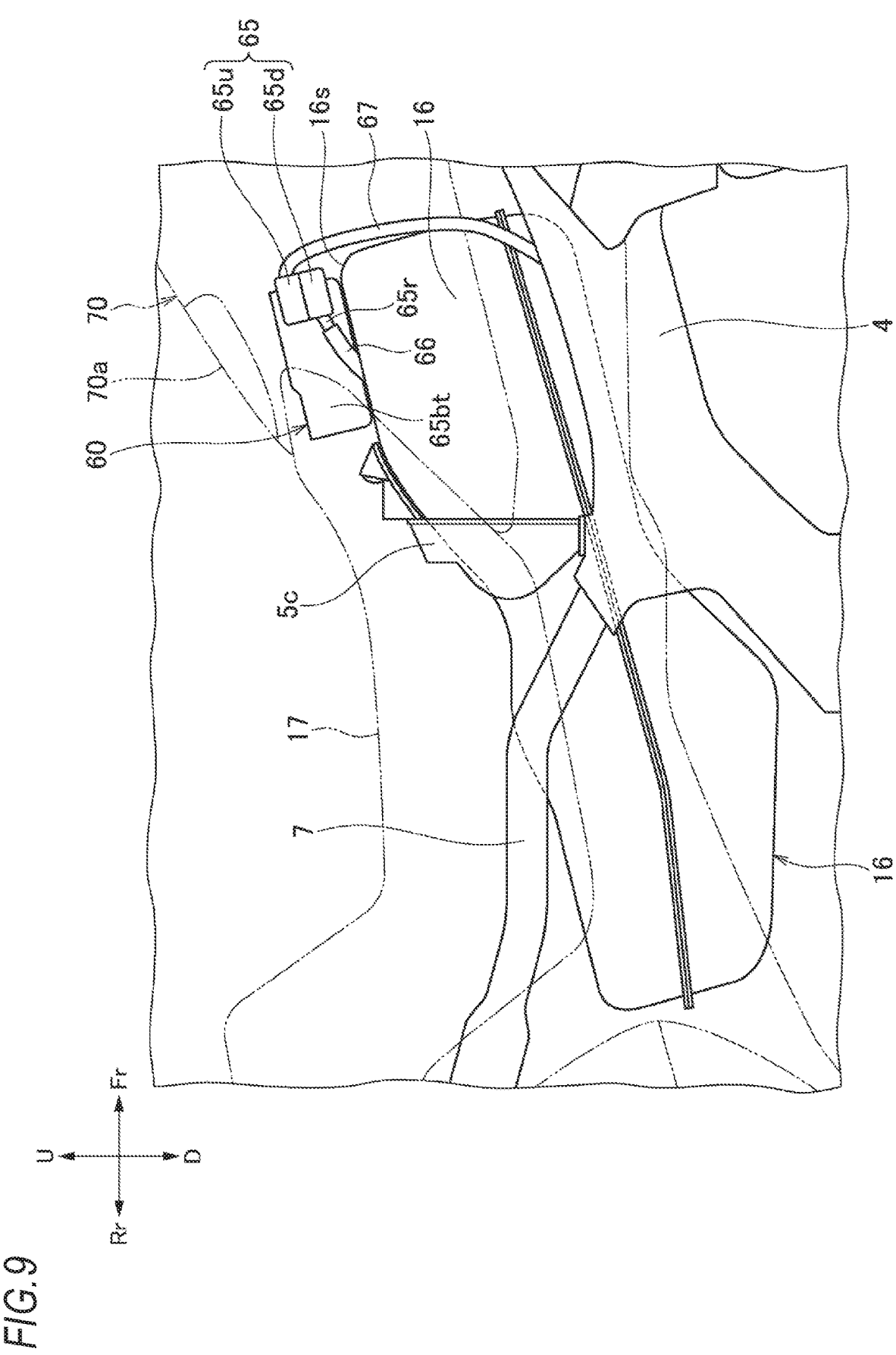
FIG. 9 is an enlarged right side view of the motorcycle illustrated in FIG. 1 as viewed from the right side while passing through the cover member and a riding seat.

As illustrated in FIGS. 7 and 9, the gas-liquid separator 65 is supported by the fuel tray 60 via the separator connection portion 60g, and thus the gas-liquid separator 65 is arranged to be separated from the tank upper surface 16s of the fuel tank 16. Also, the bottom surface 65b of the gas-liquid separator 65 is inclined rearwardly and downwardly as illustrated in the drawings and is inclined at an angle different from that of the tank upper surface 16s inclined in the front downward direction just below the gas-liquid separator 65.

Figure 8:
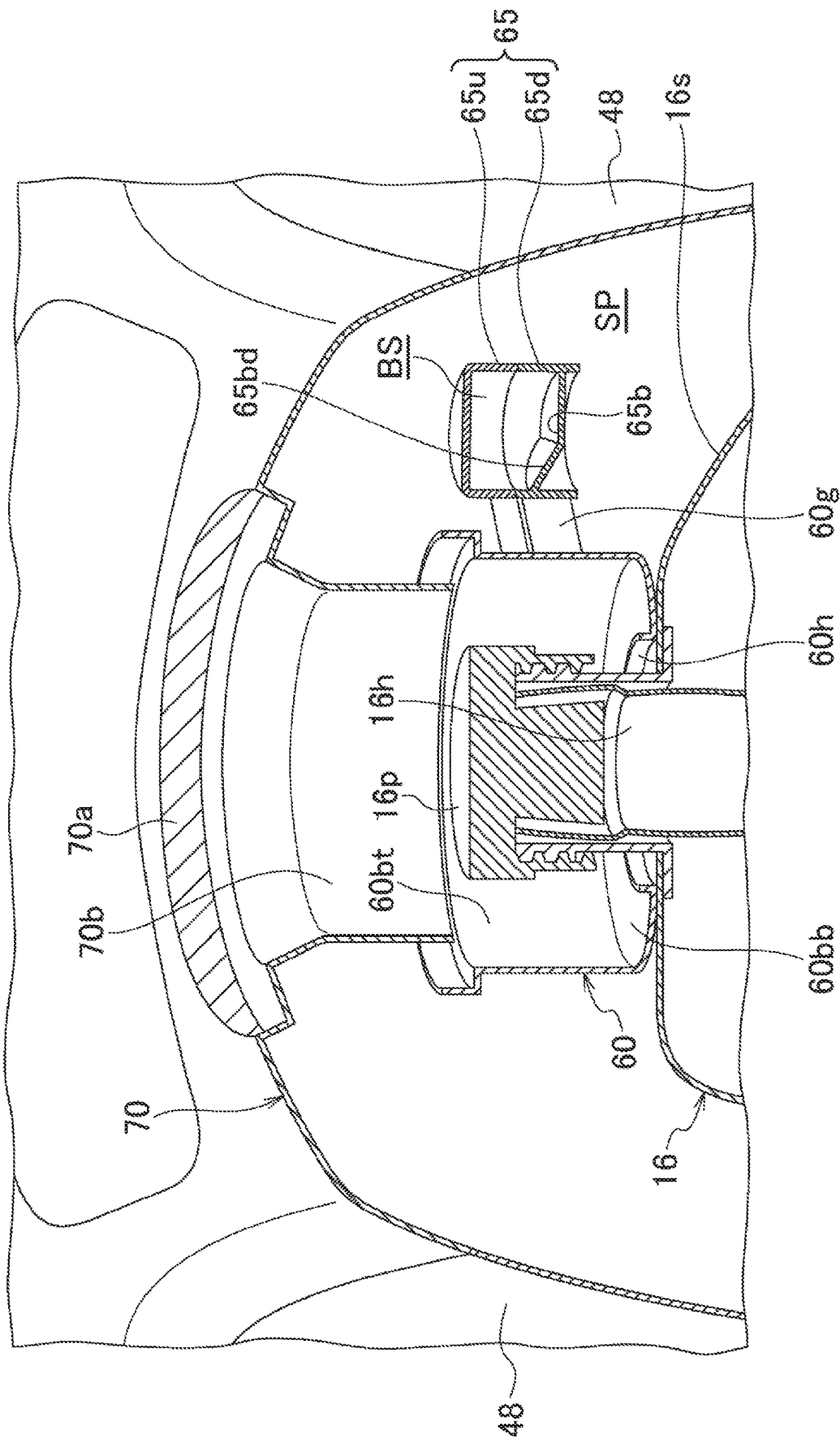
FIG. 8 is a cross-sectional rear view taken along a line B-B of FIG. 2 in the state where the cover member is mounted.

As illustrated in FIG. 8, in the fuel tray 60, the fuel filler port 16h of the fuel tank 16 is inserted through the tray opening 60h and is fixed above the fuel tank 16 such that the periphery of the fuel filler port 16h is surrounded by the tray bottom surface portion 60bb and the side wall portion 60bt. Further, the upper portion of the fuel tray 60 is covered with a top cover 70 which is a cover member. The top cover 70 is provided with a fuel lid 70a which can be opened and closed corresponding to the fuel filler port 16h. In addition, the top cover 70 is provided with an opening wall surface 70b extending downward toward the inner side of the side wall portion 60bt of the fuel tray 60. A space SP is formed between the fuel tank 16 and the top cover 70 on the outside of the opening wall face 70b of the top cover 70 and the side wall portion 60bt of the fuel tray 60. The gas-liquid separator 65 is disposed in the space SP.

As illustrated in FIG. 7, the above-described breather pipe 66 connecting the fuel tank 16 and the gas-liquid separator 65 is routed between the fuel tank 16 and the top cover 70, that is, the space SP, on the side of the tray portion 60b of the fuel tray 60. The purge pipe 67 is supported by the central guide portion 60k and the left guide portion 60j. Further, the purge pipe 67 is routed on the side wall portion 60bt of the fuel tray 60 and the front portion of the fuel tank 16 and is connected to the canister (not illustrated).

Further, when the side stand 10 is raised at the time of vehicle parking, the vehicle body is inclined to the left side. In this case, the rising portion 65bd is provided, and thus the fuel in the gas-liquid separator 65 cannot stay on the left side of the bottom surface 65b and is returned from the breather pipe connection portion 65r to the fuel tank 16 through the breather pipe 66.

Although an embodiment of the invention has been described above, the invention is not limited thereto and can be modified as appropriate. For example, in the embodiment described above, the gas-liquid separator 65 is configured to be integrally molded on the fuel tray 60, but it may not be provided by integral molding. Further, the position at which the gas-liquid separator 65 is provided is not limited to the embodiment described above and can be appropriately changed in consideration of the vehicle body structure. Also, the shape of the gas-liquid separator 65 and the fuel tray 60 is not limited to the embodiment described above.

In the embodiment described above, a motorcycle is described, but the invention may be another straddle vehicle such as a tricycle or a four-wheeled vehicle.

DESCRIPTION OF REFERENCE NUMERALS AND CHARACTERS

1: motorcycle (straddle vehicle)
16: fuel tank
16s: upper surface
16h: fuel filler port
60: fuel tray 60*b*: tray portion
65: gas-liquid separator
65*b*: bottom surface
65*bd*: rising portion
65*r*: breather pipe connection portion
65*f*: purge pipe connection portion
66: breather pipe
67: purge pipe
70: top cover (cover member)
70*a*: fuel lid
SP: space

The invention claimed is:

1. A straddle vehicle comprising:
a fuel tank structure, the fuel tank structure comprising:
   a fuel tank which accumulates fuel supplied from a fuel filler port;
   a fuel tray which is provided above the fuel tank so as to surround the fuel filler port; and
   a gas-liquid separator which is connected to the fuel tank and separates the fuel into gas and liquid, wherein
   the gas-liquid separator is spaced apart from the fuel tank and provided on the fuel tray, and
   a bottom surface of the gas-liquid separator is inclined at an angle different from that of a tank upper surface of the fuel tank.

2. The straddle vehicle according to claim 1, wherein the gas-liquid separator is a resin member integrally formed with the fuel tray.

3. The straddle vehicle according to claim 1, wherein the gas-liquid separator comprises:
   a breather pipe connection portion, to which a breather pipe leading to the fuel tank is connected, in a lower portion; and
   a purge pipe connection portion, to which a purge pipe leading to a canister is connected, in an upper portion.

4. The straddle vehicle according to claim 3, wherein a rising portion inclined toward an upper left side is provided in the bottom surface of the gas-liquid separator.

5. The straddle vehicle according to claim 1, wherein the fuel tank is covered with a cover member including a fuel lid which is openable and closable above the fuel tray, and
the gas-liquid separator is arranged in a space between the fuel tank and the cover member.

6. The straddle vehicle according to claim 5, wherein a breather pipe for connecting the fuel tank and the gas-liquid separator is routed between the fuel tank and the cover member on a side of a tray portion of the fuel tray.

\* \* \* \* \*